(12) United States Patent
Willner (10) Patent No.: US 8,730,300 B1
(45) Date of Patent: May 20, 2014

(54) THREE DIMENSIONAL TELEVISION ENCODING AND BROADCASTING METHOD

(71) Applicant: Byron J. Willner, Hot-Springs, VA (US)

(72) Inventor: Byron J. Willner, Hot-Springs, VA (US)

( * ) Notice: Subject to any disclaimer, the term of this patent is extended or adjusted under 35 U.S.C. 154(b) by 0 days.

(21) Appl. No.: 13/741,904

(22) Filed: Jan. 15, 2013

(51) Int. Cl.
*H04N 13/00* (2006.01)
*H04N 13/02* (2006.01)

(52) U.S. Cl.
USPC .................. 348/42; 348/43; 348/46; 348/47

(58) Field of Classification Search
USPC ......................... 348/42, 43, 46, 47
See application file for complete search history.

(56) References Cited

U.S. PATENT DOCUMENTS

| | | | | |
|---|---|---|---|---|
| 2,566,700 A * | 9/1951 | Goldsmith | ...................... | 348/46 |
| 3,504,122 A * | 3/1970 | Ratliff, Jr. | ...................... | 348/47 |
| 3,705,261 A * | 12/1972 | Langley | ...................... | 348/42 |
| 3,896,487 A * | 7/1975 | Tesler | ...................... | 348/43 |
| 4,208,671 A * | 6/1980 | Ozawa et al. | ...................... | 386/303 |
| 4,367,486 A * | 1/1983 | Eichenlaub | ...................... | 348/42 |
| 4,567,513 A * | 1/1986 | Imsand | ...................... | 348/55 |
| 4,734,756 A * | 3/1988 | Butterfield et al. | ...................... | 348/43 |
| 4,897,715 A * | 1/1990 | Beamon, III | ...................... | 348/115 |
| 4,905,081 A * | 2/1990 | Morton | ...................... | 348/43 |
| 5,283,640 A * | 2/1994 | Tilton | ...................... | 348/42 |
| 5,416,510 A * | 5/1995 | Lipton et al. | ...................... | 348/43 |
| 6,157,402 A * | 12/2000 | Torgeson | ...................... | 348/59 |
| 6,229,561 B1 * | 5/2001 | Son et al. | ...................... | 348/42 |
| 2006/0238613 A1 * | 10/2006 | Takayama et al. | ...................... | 348/47 |
| 2011/0181694 A1 * | 7/2011 | Kim et al. | ...................... | 348/43 |
| 2012/0205583 A1 * | 8/2012 | Montenegro et al. | ...................... | 252/299.63 |
| 2012/0257020 A1 * | 10/2012 | Yee et al. | ...................... | 348/46 |
| 2013/0010073 A1 * | 1/2013 | Do et al. | ...................... | 348/46 |
| 2013/0063565 A1 * | 3/2013 | Hara et al. | ...................... | 348/46 |
| 2013/0222543 A1 * | 8/2013 | Bae et al. | ...................... | 348/46 |

* cited by examiner

*Primary Examiner* — Dave Czekaj
*Assistant Examiner* — David N Werner
(74) *Attorney, Agent, or Firm* — Alfred F. Hoyte, Jr.

(57) ABSTRACT

The present invention is directed to a method of encoding, broadcasting, transmitting, decoding, and displaying a 3D image signal. The image signal is acquired by deploying a pair of stereoscopically positioned digital cameras to acquire a corresponding pair of digital image signals. A first camera is operated in a horizontal scan mode, while a second camera is operated in a vertical scan mode to produce differential video signals. The unmixed signals are simultaneously transmitted, each via one of dual single sidebands on the same center frequency. A video receiver includes digital signal decoding and processing circuitry and a standard digital display having both horizontal and vertical scan capability. The receiver decodes the dual sideband signal and presents the 3D image signal via alternating horizontal and vertical scans to produce a 3D image.

5 Claims, 12 Drawing Sheets

THREE DIMENSIONAL TELEVISION ENCODING AND BROADCASTING METHOD

BACKGROUND OF THE INVENTION

1. Field of the Invention

The present invention relates to a system and apparatus for producing three-dimensional television images. More specifically, the invention relates to means for scanning, transmitting/acquiring, and projecting three-dimensional images using two cameras and a Dual Single Side Band to transmit image signals to a client receiver for demultiplexing to a display device. The image on the display device can be viewed without the use of special 3D glasses.

2. Description of the Prior Art

U.S. Pat. No. 4,567,513 issued to Imsand discloses an early attempt at broadcasting 3D signals. The system uses alternate video signals from stereoscopic cameras to provide a composite 3D image. Like many early 3D systems, digital signal processing is used to "converge" the image and reduce blur and other undesirable artifacts.

U.S. Pat. No. 6,075,556 issued to Urano et al. Discloses a 3D television encoding system where left and right eye images are horizontally scanned to produce left and right line image signals, the image signals are then converged or mixed using digital signal processing techniques. As with the Imsand patent, no broadcasting technique is disclosed.

The present invention is directed to a method of encoding, broadcasting, transmitting, decoding, and displaying a 3D image signal. The image signal is acquired by deploying a pair of stereoscopically positioned digital cameras to acquire a corresponding pair of digital image signals. A first camera is operated in a horizontal scan mode, while a second camera is operated in a vertical scan mode to produce differential left and right video signals. The unmixed signals are simultaneously transmitted, each via one of dual single sidebands on the same center frequency. A video receiver includes digital signal decoding and processing circuitry and a standard digital display having both horizontal and vertical scan capability. The receiver decodes the dual sideband signal and presents the 3D image signal via alternating horizontal and vertical scans to produce a 3D image from the differential left and right video signals.

In one application of the inventive technique a virtual retinal display device is driven by the received and decoded left and right image signals to form a 3D image directly on the retinas.

In another application of the invention a pair of cameras are mounted in a helmet worn by armed forces personnel, the cameras utilizing the differential scanning method of the invention to produce a 3D image which can be viewed within the helmet. The differential signal may be transmitted to a base station for ranging and other processing employing the transmitting method as described above. Additionally, a laser rifle scope may be synced to the helmet to allow personnel to peer over and around cover using the rifle scope image, which is transmitted via, e.g., Bluetooth to the helmet for display on either the left or right image display.

In another application a compact pair of stereoscopic cameras may be mounted on or integrated with a robotic bomb disarming unit, with the image data transmitted to a remote location to allow for more efficient manipulation of the robot toolset using a 3D image.

SUMMARY OF THE INVENTION

It is a major object of the invention to provide a novel 3D image capturing and broadcasting method.

It is another object of the invention to provide a 3D image capturing and broadcasting method using stereoscopic cameras to capture left and right images using horizontal and vertical scans.

It is another object of the invention to provide a 3D image capturing and broadcasting method using dual sidebands to transmit left and right image signals simultaneously on different sidebands to reduce noise due to left and right image signal mixing.

It is another object of the invention to provide a 3D image capturing and broadcasting method which has several applications.

It is another object of the invention to provide a 3D image capturing and broadcasting method where one of the stereoscopic cameras scans horizontally and the other camera scans vertically to produce differential image signals.

It is another object of the invention to provide a 3D image capturing and broadcasting method which can be applied to a helmet having a pair of horizontally disposed cameras mounted thereon to produce differential image signals, and transmitting the signals to a base station using the broadcast method of the invention.

BRIEF DESCRIPTION OF THE DRAWINGS

Various other objects, features, and attendant advantages of the present invention will become more fully appreciated as the same becomes better understood when considered with the accompanying drawings, in which like reference characters designate the same or similar parts throughout the several views, and wherein.

DETAILED DESCRIPTION OF THE PREFERRED EMBODIMENTS

Referring now to FIGS. 1-12, the 3D system of the invention 10, with its various applications, is illustrated. The system allows for 3D image acquisition, transmission, and display. Acquisition is accomplished using a standard set of stereoscopic digital cameras 3, 5, angled in and horizontally opposed, and focused on the image 1 to be transmitted and displayed. The cameras 3, 5 produce differential images by virtue of both the horizontal spacing and the scanning technique. Specifically, camera 3 scans horizontally while camera 5 scans vertically. Cameras 3 and 5 would have to have switchable (between vertical and horizontal scan modes) scan modes to implement the inventive technique. The differential scan technique enhances the 3D image when displayed on either a standard display or a retinal display. The scans may be simultaneous or alternate.

Figure 1:
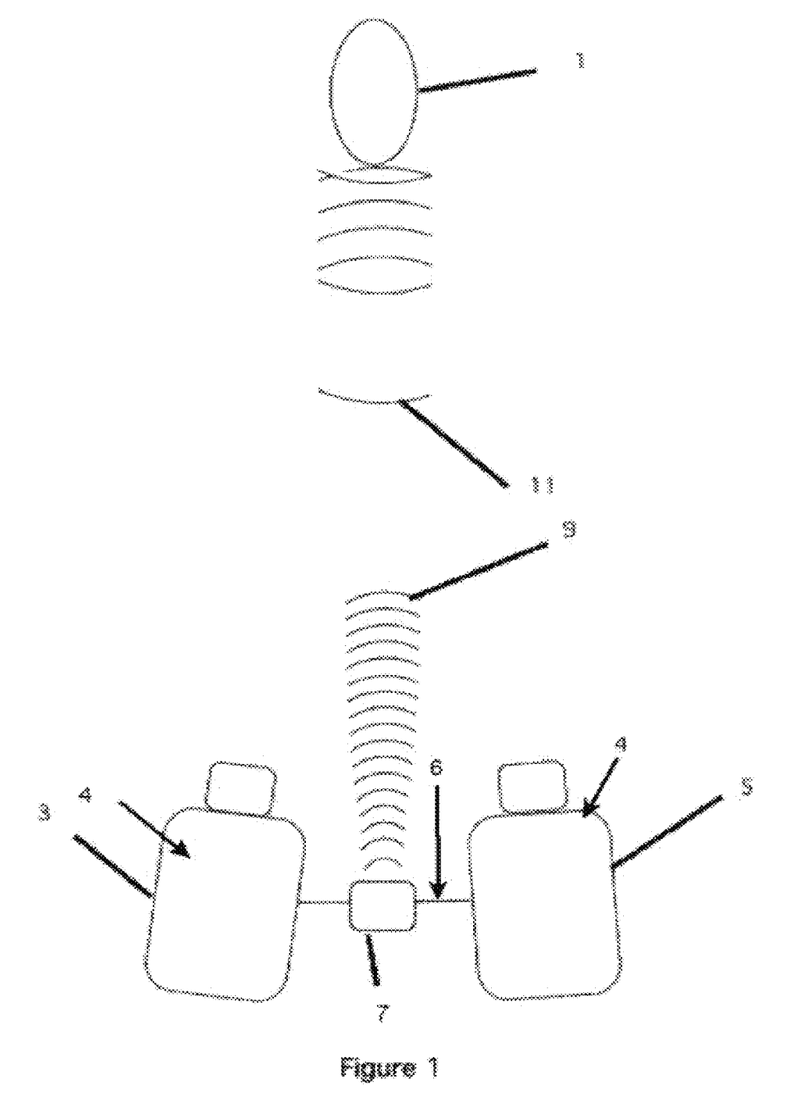
FIG. 1 shows an overhead view of stereoscopic cameras positioned to capture a 3D image.

The cameras 3, 5 include servo controlled positioning and focusing assemblies 4 which are operated in response to control signals generated by a distance measuring FM transceiver 7. The cameras 3, 5 may be repositionably mounted on a bracket 6 which allows a limited amount of horizontal translation and angular adjustment using motorized assemblies 4 to allow for relative repositioning of the cameras 3,5 depending upon the distance and angle of the image as would be apparent to one of skill in the art. For example, for very far away images the distance between the cameras 3, 5 would be increased, and the angle (toe-in) of the cameras 3, 5 would be shallower. Other means of horizontal displacement of cameras 3, 5 may be employed. The servo controlled auto-focus can be of a standard design and also uses signals from the transceiver 7.

Figure 2:
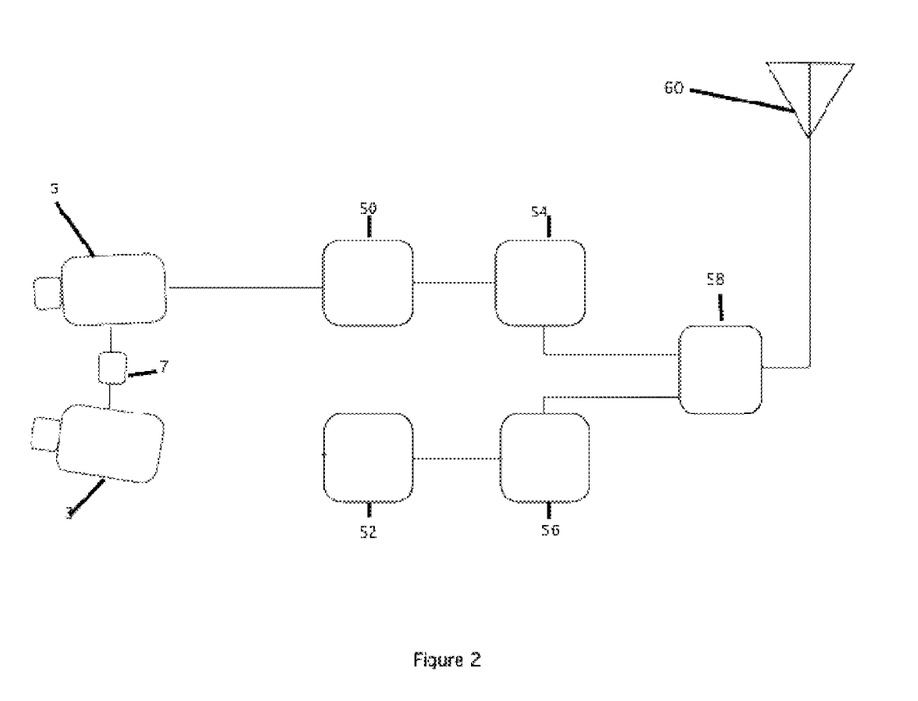
FIG. 2 is a diagrammatic illustration of the components of the transmitting end of the 3D system of the invention.

A key aspect of the invention is the method of transmitting differential image signals, where the signals are scanned differently and generated by spatially displaced stereoscopic cameras. It should be noted however that the broadcasting method could be used by any 3D broadcasting system which uses dual image signals. The image signals acquired from the cameras 3, 5 are passed through amplifiers 52, 50, and then into and through single sideband vertical (54) and horizontal (56) amplifiers. Signals from the single sideband vertical 54 and horizontal 56 amplifiers are applied to a dual sideband mixer/multiplier/transmitter unit 58, which supplies the broadcast signal to transmitting antenna 60.

In accordance with the method of the invention, the image signals are not mixed and broadcast on a single center frequency, but are broadcast simultaneously but separately in either of the two sidebands. This reduces noise at the transmitting end as the signals are not mixed, and also reduces interference as it is unlikely that both sidebands will be simultaneously disrupted by, e.g., EMI. The method also has the advantage of bandwidth efficiency, with the center frequency being available to transmit control signals for controlling certain aspects of image display.

Figure 3:
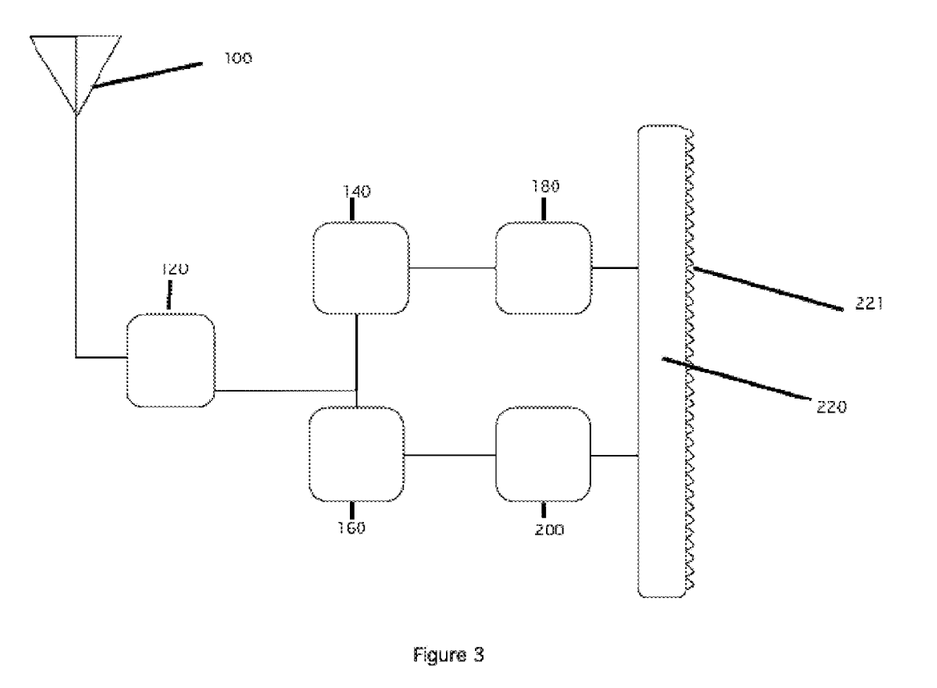
FIG. 3 is a diagrammatic illustration of the components of the receiving end of the 3D system of the invention.

Reception of the transmitted image signal is carried out via receiving antenna 100 which applies the dual sideband signal to demultiplexing unit 120, which strips the image signals from the carrier to produce horizontal and vertical (i.e., left and right) scan and image signals which are applied, respectively, to single sideband amplifiers 160, 140. Horizontal and vertical scan amplifiers 200, 180 amplify the signals from (transmitted from) stereoscopic cameras 3, 5 which are then applied to receiver/display screen 220. If only one of the sideband signals is received, the resulting image can still be displayed in 2 dimensional mode on the display screen 220.

The display screen 220 may be either a standard 3D display screen such as an LCD monitor with a housing and receiving circuitry, or a pair of retinal display screens 222, 224 (FIG. 10), with the latter having applications as will be discussed in more detail later. If a standard display screen 220 is used the receiving circuitry (120, 140, etc.) will have to be capable of receiving the double sideband signal and responding to imbedded control signals to create a scan mode consistent with the scan mode used during image acquisition as discussed below. This will require modification of the receiving and sync circuitry which may be implemented by firmware updates on some existing 3D capable sets. The use of a lenticular screen 221 positioned on the display screen 220 will allow for a 3D display of the captured image without the use of glasses. Other known techniques may be used such as a parallax barrier or holography.

Any of three image acquisition techniques (i.e. scan methods) can be used (as explained below) but once a method is selected, the receiver/display 220 must be set up to receive and properly display the image. Switching between scan methods may be accomplished by broadcasting control signals to receiver/display 220. Receiver/display 220 receives the control signals and software (firmware) can allow for "mode" switching, and new modes may be implemented via firmware updates which can be automatic for "smart" TVs, and downloaded or otherwise installed for older systems. It can be appreciated that the system is designed to be implemented using hardware made in accordance with the present description, but some compatibility with existing 3D ready sets is possible using methods apparent to one of skill in the art.

Referring again to FIG. 1, as previously discussed, image acquisition from cameras 3, 5 may be accomplished via a full vertical scan with one camera 3, and horizontal scan with the other camera 5, and projection in the same manner. Alternative scan methods to produce a differential image signal include; vertical scan half horizontal distance with camera 3, horizontal scan the remaining half with camera 5, and projection in the same manner, either full or half distance vertical or horizontal scan on both cameras and projection in the same manner. Using the vertical scan half horizontal distance method, camera 3 scans an image 1 using a vertical scanning method to the center of focused image 1 while the camera 5 will scan in the horizontal direction from the center of the focused image 1. Each camera 3,5 scan will be processed and presented for transmission on a frequency side band. Each side band will be transmitted on a single carrier frequency. Another stereoscopic image capture method has one camera 3 scanning an image 1 using a vertical or horizontal scanning method either full (i.e., standard stereoscopic camera operation), or half while the other camera 5 will scan the other vertical or horizontal half in the identical method. Each camera 3, 5 scan will be processed and presented for transmission on a frequency side band. Each side band will be transmitted on a single carrier frequency.

The cameras 3, 5 may be standard digital cameras capable of either horizontal or vertical scan modes, while the display device 220 must be a 3D display device capable of receiving stereoscopic signals, namely, the left and right image signals transmitted in the dual single sidebands, and applying the signals to the display screen 220 to produce left and right eye signals. The left and right eye signals are superimposed without blur when viewed through screen 220 to produce a realistic 3D effect, using scan techniques known in the art for rendering 3D images from a stereoscopic image signal.

With camera 3 in horizontal scan mode and camera 5 in vertical scanning mode, scan processing for camera 3 starts in the standard upper left corner with the horizontal scan and proceeds to the right while the horizontal scan would proceed, line by line, down vertically. Scan processing for camera 5 also starts in the standard upper left corner and proceeds down, line by line from left to right. In the case of the half horizontal scan as described above, scan processing for the left horizontal scan would start in the upper left corner and proceed to the center of the image while the right horizontal scan would start in the center. Some overlap would be allowed. Scan process can start in the upper left corner and proceed to the rescan point. As soon as the first left horizontal scan begins the right horizontal scan begins but at a minimal time lag. Scanning process for the third scenario will be the same as for the second scenario except presentation 220 scanning process will be vertical. Video projection 220 will mirror the camera scanning method as described in more detail below.

In lieu of scan syncing from the upper left corner, scan sync can be initiated from the center top of the projection screen 220 with vertical scan on one half and horizontal scan on the other half. Some overlap can be allowed to minimize a centerline demarcation. Alternately, two independent vertical scans or two independent horizontal scans can be used on each transmission half. This will require two independent synced cameras are used. Another display 220 scan scenario is a vertical (or horizontal) scan method used for image 1 capture, transmission, and reception but presentation on the projection screen 220 would have one vertical (or horizontal) scan start followed immediately by the other vertical (or horizontal) scan.

Figure 12:
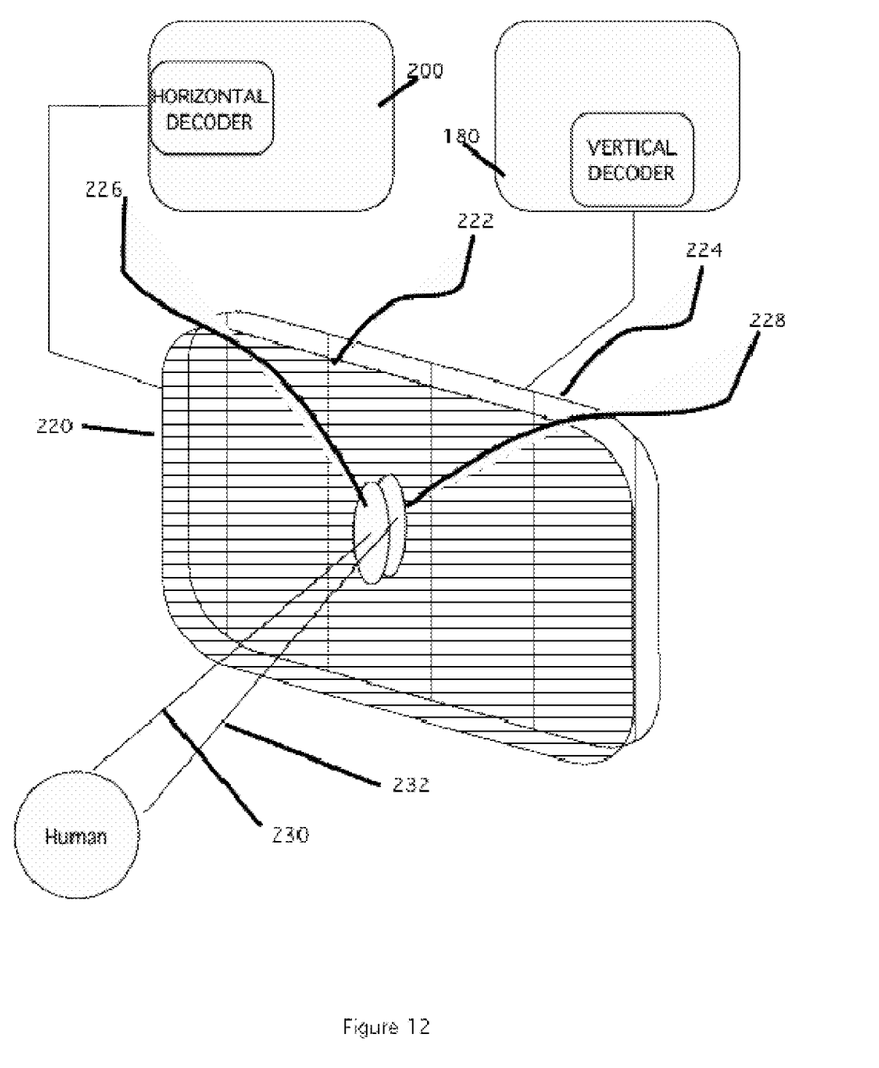
FIG. 12 shows a diagrammatic representation of the method of the invention illustrating display on a pair of retinal display devices.

The method of the invention may be advantageously used to display 3D images on a retinal display system as shown in FIG. 12. The system, having electronics as shown and discussed in reference to FIG. 2, has a two layer screen; one for the left eye 222, and one for the right eye 224. An alternative means for projecting 3 dimensional images uses two thin screen flexible Retina displays 222, 224 with one directly behind the other and in contact, i.e., no space. The front display 222 would project the image 226 from the left camera, as the right eye is generally dominant, and the rear most display 224 would project the right camera image 228. The front 222 screen or left camera projection 226 would be translucent enough to view the back or right camera projection 228 in superimposed relation.

It should be noted that if the image 226, 228 is not clear to an individual with a dominant right eye but is clear to an individual with left eye predominance, the system electronics should be capable of electronically switching the display 222 from front to back in response to a user input from a control panel or remote (not shown). Also, the amount of light transmitted through the front screen 222 may be electronically adjusted.

Figure 10:
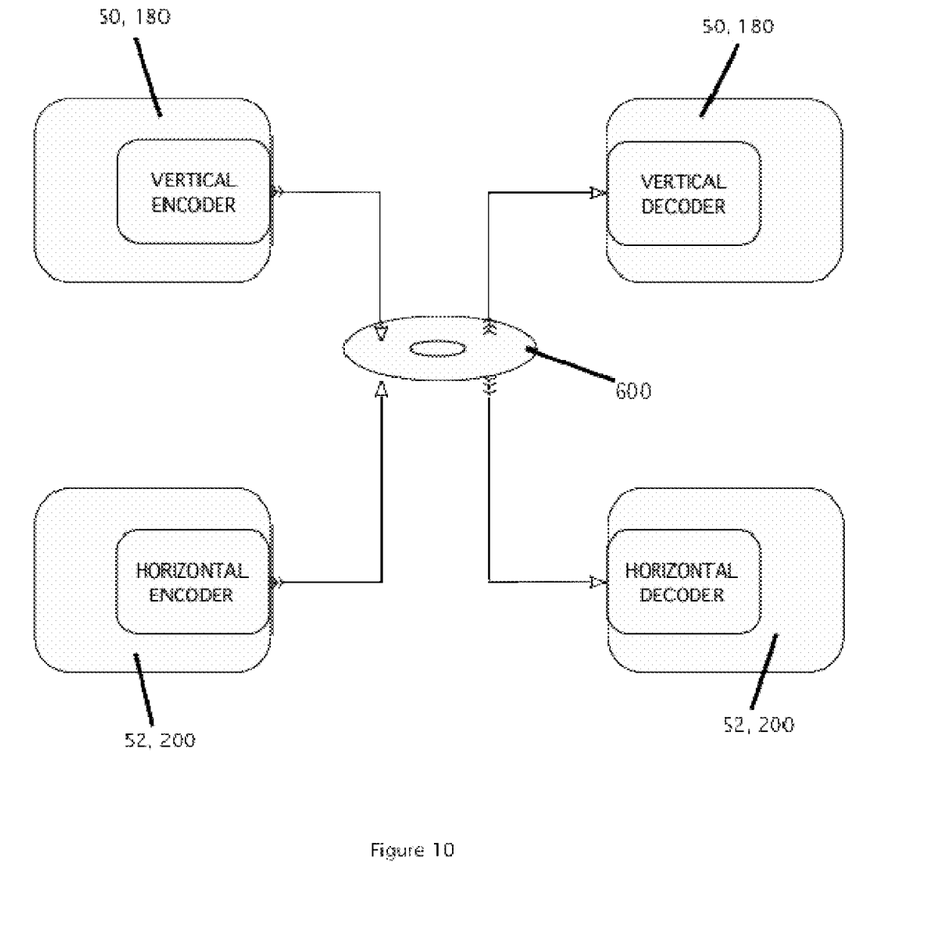
FIG. 10 shows a diagrammatic representation of the method of the invention used to encode a recordable disc with 3D data.
Figure 11:
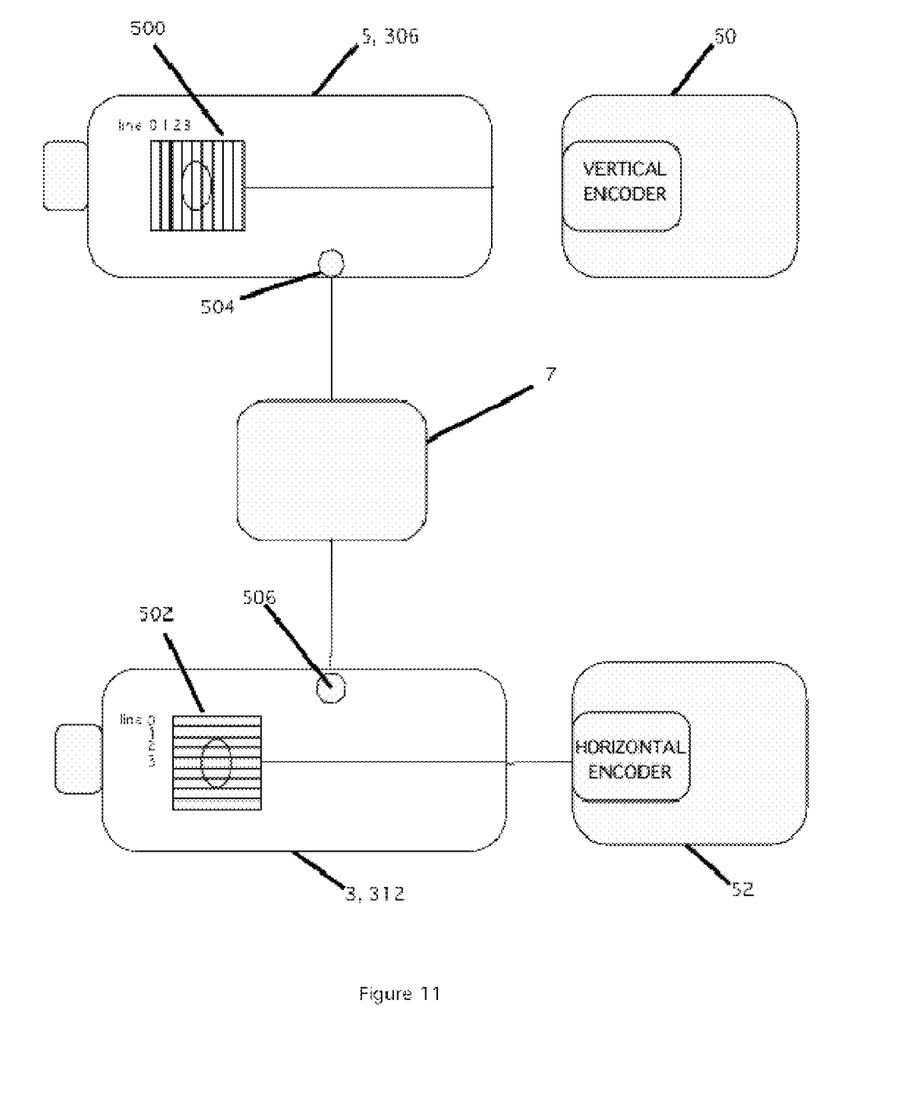
FIG. 11 shows a diagrammatic representation of the method of the invention illustrating image capture.

One application of the 3D broadcast system would be to allow an "amateur" videographer to create a 3D video image signal compatible for use with screen 220. As previously mentioned, screen 220 and associated electronics are capable of interpreting the dual sideband broadcast signal to produce superimposed images. In this application, cameras 3, 5 would be handheld personal cameras which function in concert as discussed above (i.e., servo controlled using bracket 6 and positioning motors 4 to automatically adjust camera angles, spacing, and focus). The resulting video signals may be broadcast via transmitter 58 in the manner discussed above or alternatively sent via cable to an input in the receiving system housing such that the signals bypass the demultiplexer circuit and is applied directly to the receiver sync and scan circuitry. In lieu of broadcast or direct link, the video signals from cameras 3 and 5 may be sent to a dvd burner for recording onto a two sided or two layer disc.

Figure 4:
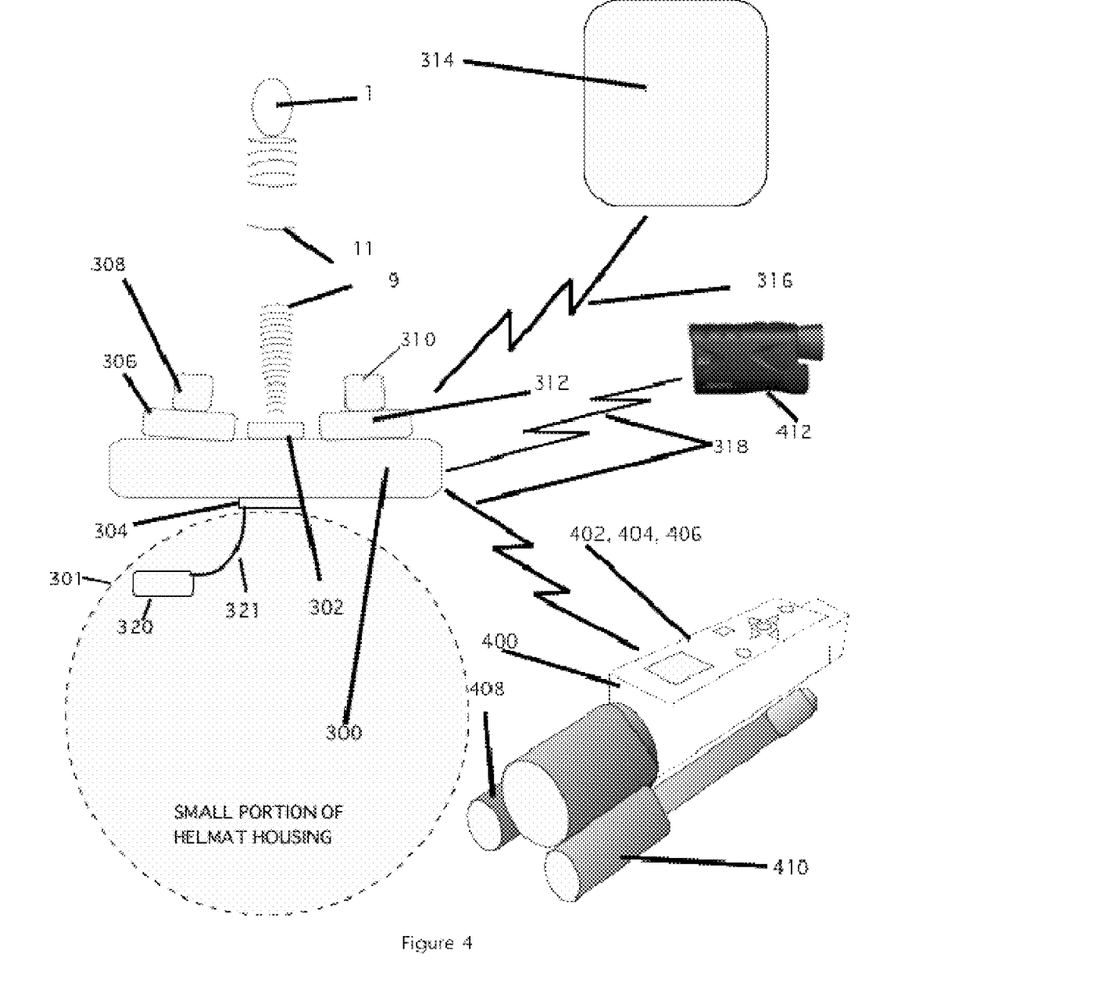
FIG. 4 is a diagrammatic illustration of the components of the transmitting end of one application of the 3D system of the invention.
Figure 5:
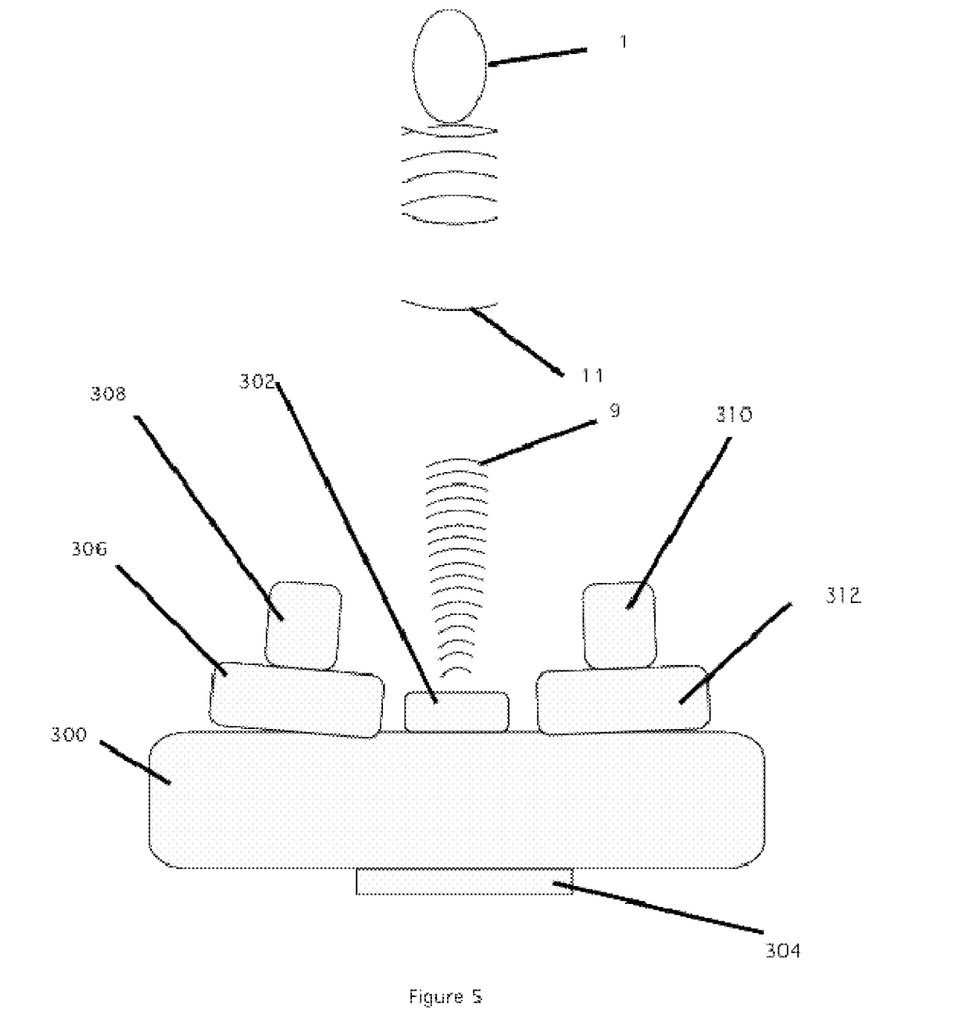
FIG. 5 shows an overhead view of helmet mounted stereoscopic cameras positioned to capture and transmit a 3D image to a remote location.

Referring now to FIG. 4, one of several applications of the 3D system of the invention is shown. This application allows a soldier or other armed forces personnel to employ a swing-down video binoculars assembly 300 to acquire a stereoscopic image via left and right cameras 306, 312 using the alternate scan methods described above. The binoculars assembly 300 is physically and electrically attached to a helmet 301 to allow for display of acquired images within the helmet 301, as well as transmission of acquired images to a remote station. The 3D images captured by cameras 306, 312 are acquired via stereoscopically positioned lens assemblies 308, 310 in the manner described above. Distance to target data is acquired by a range transponder 302, thereby allowing the assembly 300 to produce left and right image data as well as distance data which can be transmitted via transmitter 316 in accordance with the double sideband transmission method as discussed above. The distance data can be transmitted using the modulated center frequency as discussed above. A base station 314 receiving the image/distance signal can decode the transmission signal to produce a 3D image with distance to target information, dispayable in superimposed fashion on a display such as that (220) discussed above. The base station 314 would be configured to decode the dual sideband signal mode and would only operate one scanning mode (e.g., full vertical scan from one camera with horizontal scan from the other).

Figure 6:
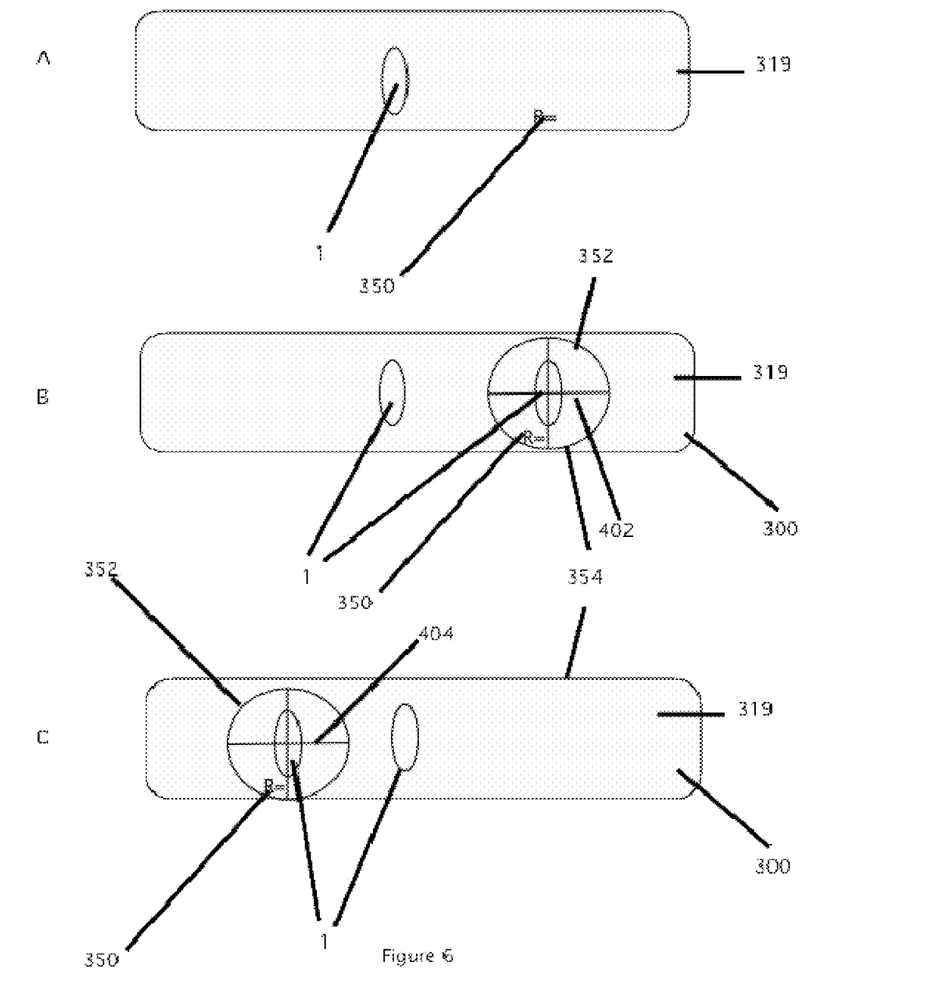
FIG. 6A shows a diagrammatic illustration of a display within the helmet of FIG. 5 showing a 3D image.
FIG. 6B is a diagrammatic illustration of the display within the helmet of FIG. 5 showing superimposed image data.
FIG. 6C is a diagrammatic illustration of the display within the helmet of FIG. 5 showing superimposed image data.
Figure 7:
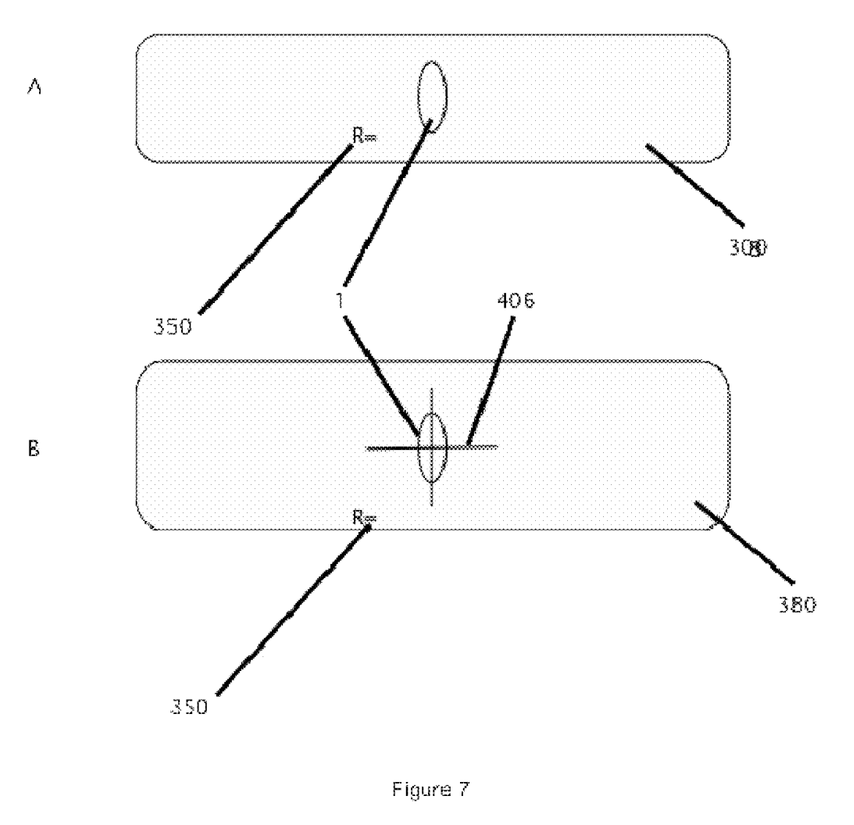
FIG. 7A shows another diagrammatic illustration of a display within the helmet of FIG. 5.
FIG. 7B shows a diagrammatic illustration of the display within the helmet of FIG. 5 showing superimposed image data.

Referring to FIG. 6, a head up display 319 positioned interiorly of the helmet 301 is shown. The display 319 is hardwired to assembly 300 via wires or preferably electrical contacts 321 and printed circuit segments (to eliminate the possibility of broken wires from impact) configured within the helmet 301 in a manner as would be apparent to one of skill in the art. The stereoscopic image signal 1 and distance data 350 transmitted from the cameras 306, 312 are also displayed on the head up display 319 as seen in FIG. 6A.

Figure 8:
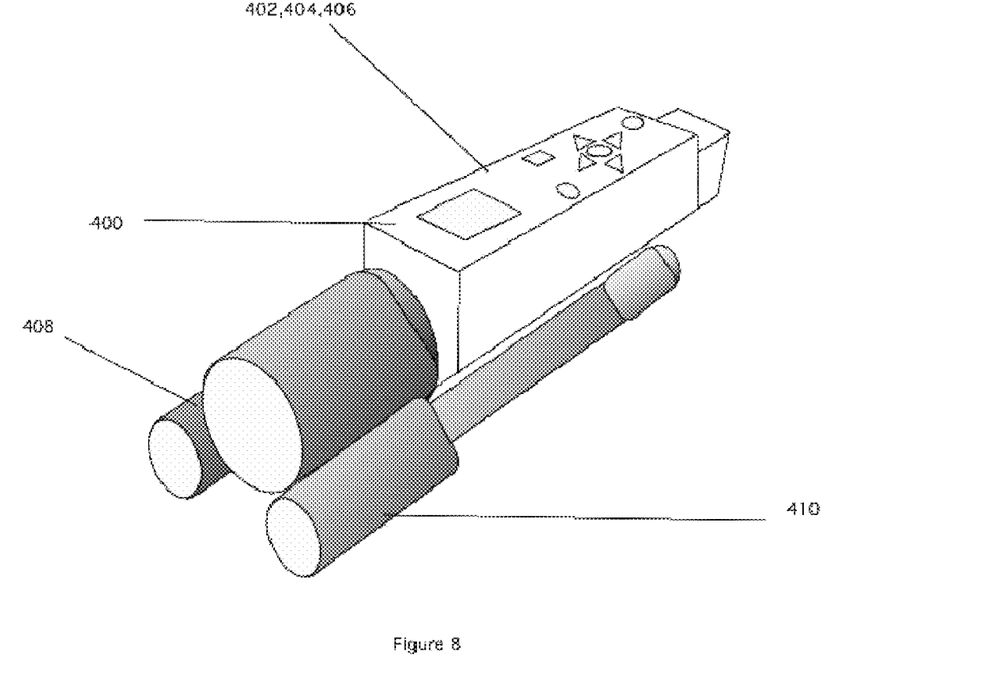
FIG. 8 shows a perspective view of a laser scope which can be used with the application illustrated in FIG. 4.
Figure 9:
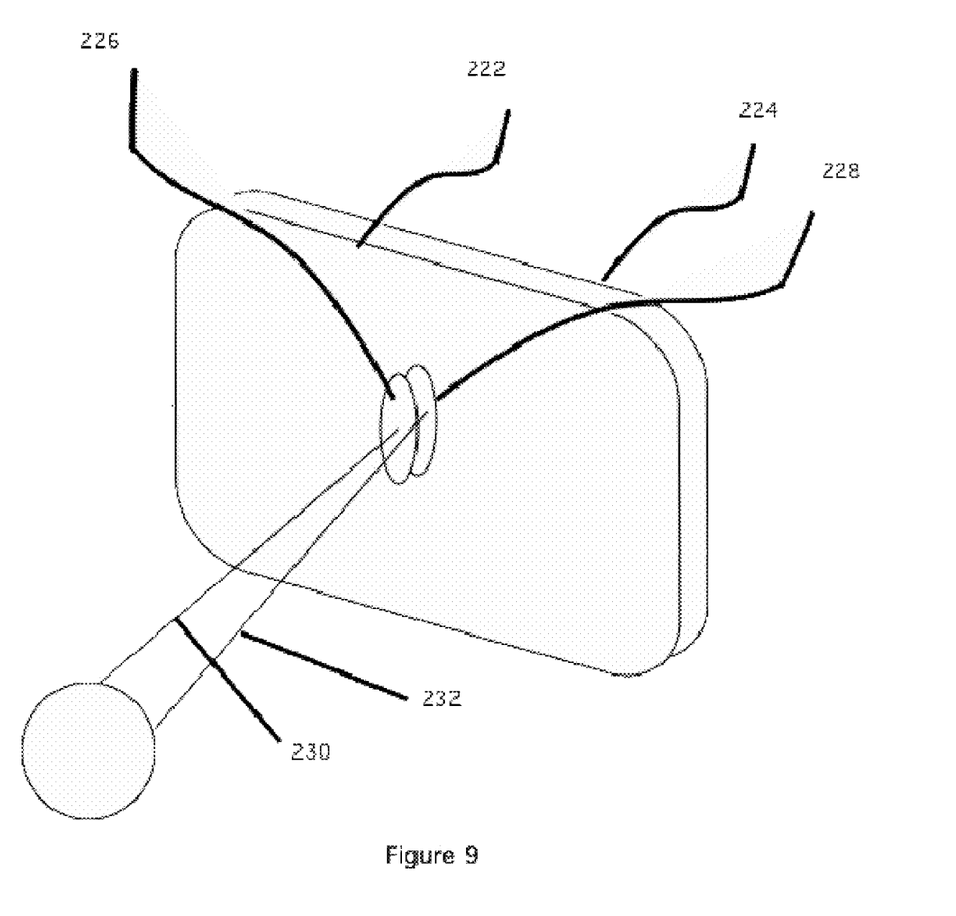
FIG. 9 shows a simulation of a retina display using the 3D system of the invention.

In another application of the inventive method a soldier or other armed forces personnel can superimpose video from a laser scope assembly 408 onto the video acquired from one of the helmet mounted cameras 306 for display on head up display 319. In this application, the laser scope assembly 408 can be maneuvered from a safe position (e.g., the operator can maneuver the scope assembly 408 from a position where his head and body are shilede from oncoming fire) until the crosshairs 402, 404 are positioned in a desired relation to the target (image 1), with the image 1 with crosshairs 402, 404 shown on either the right or left side of the display 319 as shown in FIGS. 6B and 6C respectively.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

I claim:
1. A method of acquiring, transmitting, receiving, and displaying a 3D video signal comprising the steps of:
   positioning an opposing pair of cameras to capture an image;
   operating a first of said pair of cameras in a horizontal scanning mode and operating a second of said pair of cameras in a vertical scanning mode, said first and second cameras producing first and second differential video signals;

applying said differential video signals to a transmitting apparatus which produces a 3D transmission signal having a center transmission frequency and a dual sideband output, with said first differential video signal contained in a first one of said dual sidebands, and said second differential video signal contained in a second one of said dual sidebands, said center transmission frequency containing control signals corresponding to the scanning modes of said first and second cameras;

receiving said 3D transmission signal with a display device adapted to receive and process said differential video signal and said control signals;

whereby said display device produces horizontal and vertical scans on a display screen to produce a single 3D image.

2. The method of claim 1 wherein said first camera scans a top half of said image in a horizontal scanning mode, and said second camera scans a bottom half of said image in a vertical scanning mode, said transmitting apparatus transmitting control signals corresponding to the scanning modes of said first and second cameras.

3. The method of claim 1 where said first camera scans a left side of said image in a horizontal scanning mode, and said second camera scans a right side of said image in a vertical scanning mode, said transmitting apparatus transmitting said control signals corresponding to the scanning modes of said first and second cameras.

4. The method of claim 1 where said first and second cameras are positioned on a combat helmet, and said 3d transmission signal is transmitted to a remote station.

5. The method of claim 1 wherein said display device is a pair of superimposed retinal screens.

* * * * *